Figure 1:
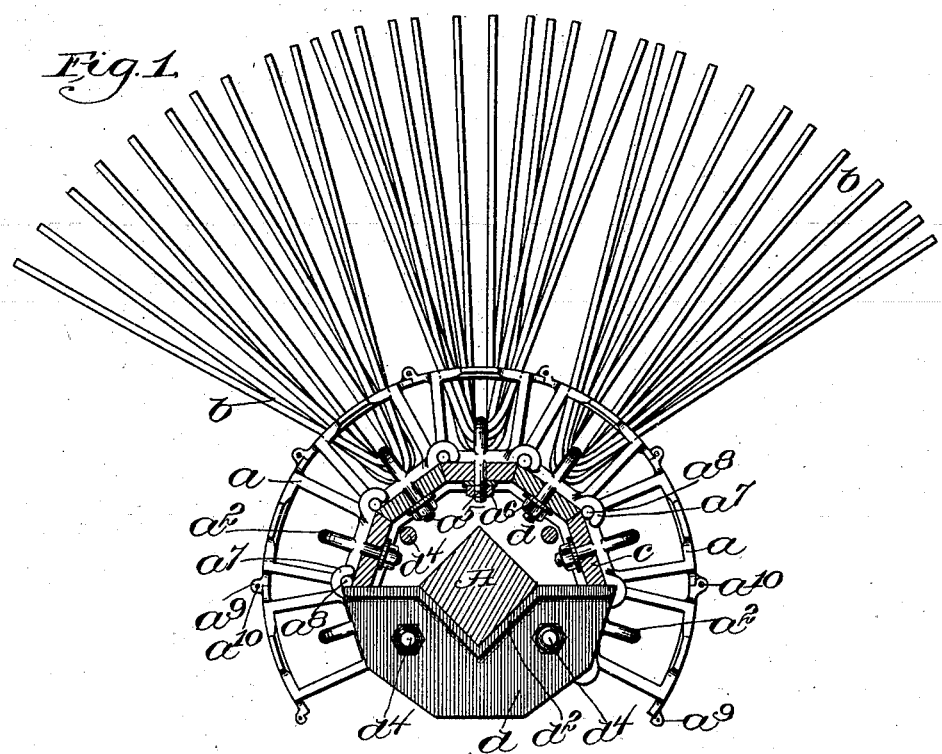

No. 657,335. Patented Sept. 4, 1900.
E. C. COLLINS.
BRUSH.
(Application filed Oct. 27, 1899.)
(No Model.) 2 Sheets—Sheet 1.

Witnesses
Jas. J. Maloney.
Nancy P. Ford.

Inventor,
Edward C. Collins.
by J. P. and J. J. Livermore
Attys.

No. 657,335. Patented Sept. 4, 1900.
E. C. COLLINS.
BRUSH.
(Application filed Oct. 27, 1899.)
(No Model.) 2 Sheets—Sheet 2.
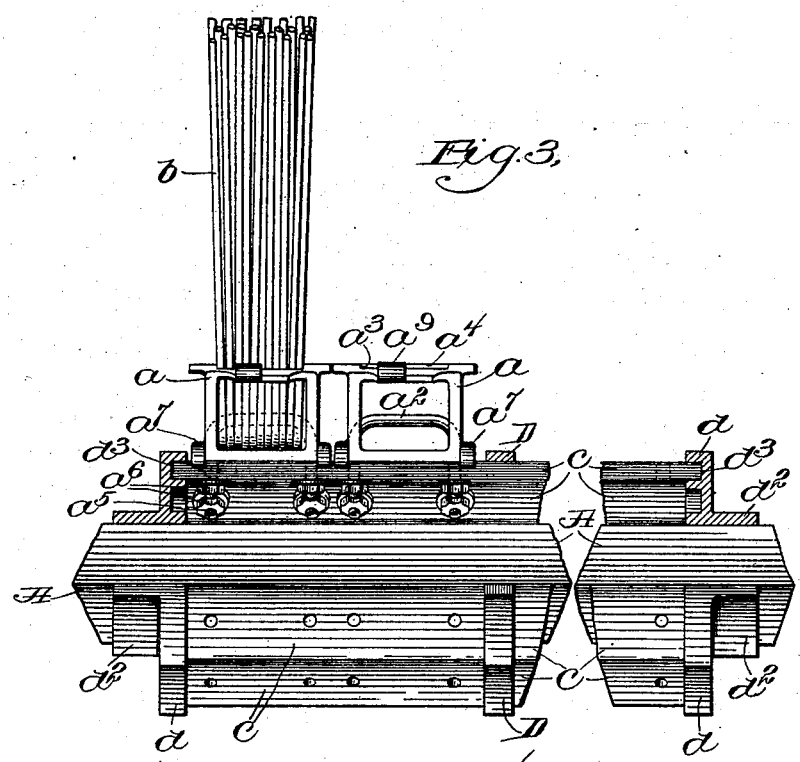
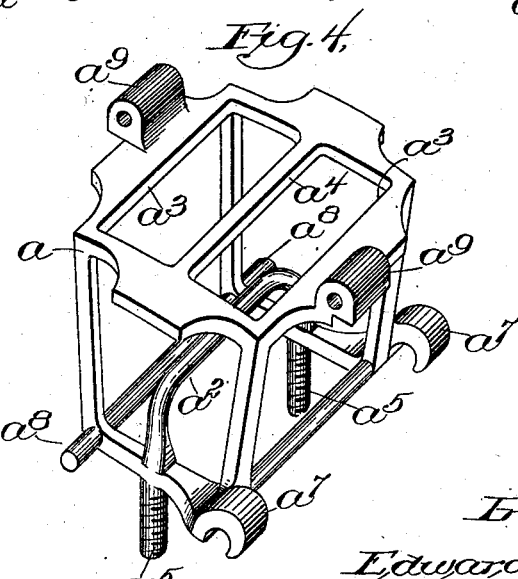
Witnesses
Jas. J. Maloney.
Nancy P. Ford.
Inventor,
Edward C. Collins,
by J. P. and H. J. Livermore
attys.

UNITED STATES PATENT OFFICE.

EDWARD C. COLLINS, OF TAUNTON, MASSACHUSETTS.

BRUSH.

SPECIFICATION forming part of Letters Patent No. 657,335, dated September 4, 1900.

Application filed October 27, 1899. Serial No. 734,937. (No model.)

*To all whom it may concern:*

Be it known that I, EDWARD C. COLLINS, a citizen of the United States, residing at Taunton, in the county of Bristol and State of Massachusetts, have invented an Improvement in Brushes, of which the following description, in connection with the accompanying drawings, is a specification, like letters on the drawings representing like parts.

The present invention relates to a brush or broom and is shown as embodied in a rotary broom for snow-sweepers and the like in which the broom material commonly used consists of sticks of ratan bent in the middle and arranged in rows lengthwise of the broom-head, the ends of the sticks forming an approximately-cylindrical sweeping-surface.

In accordance with the present invention the broom-head is provided with holders or supports of novel construction for the broom material, the said holders each comprising a cage or box adapted to be fastened to a suitable base forming a part of the broom-head and having a retaining member or holding-bar to overlie or engage in the throat or angle of the bent broom material and a pair of confining members to engage the outer portions of the broom material, so as to control the spread of the same or confine the portions of each stick or cluster of sticks at each side of the throat, so that they are retained approximately radial to the broom-head. The broom material may be inserted in the cage by passing the free ends through the bottom of the cage, between the said retaining member and the confining members, until the throat portion is properly positioned with relation to the retaining member, and the broom material is prevented from working back by the portion of the broom-head upon which the cage is supported and which is adapted to close the bottom thereof. In building up a brush a number of these cages each supplied with broom material are connected with a suitable supporting-frame, herein shown as having end plates or members which are preferably of metal and longitudinal members extending from one end plate to the other to afford the immediate supports for the cages above described. The said longitudinal members or bars may be made of wood, each such bar being inserted in channels formed in the said end plates and clamped in position by bolts extending longitudinally from one end plate to the other. The surfaces of said longitudinal bars when arranged for a rotary broom form the sides of a polygon, each of which sides is adapted to support a line of cages or holders containing the broom material, and the end plates are each made in two sections adapted to be clamped together upon the rotatable shaft of the broom.

A further feature of the invention consists in the construction and arrangement of the several parts whereby the cages are not only separately secured to the longitudinal bars of the frame, but also connected with each other, so as to form when assembled a solid structure capable of resisting the strains to which the broom is subjected, said structure, however, being readily taken apart when it is necessary to replace worn-out broom material with new broom material.

Figure 2:
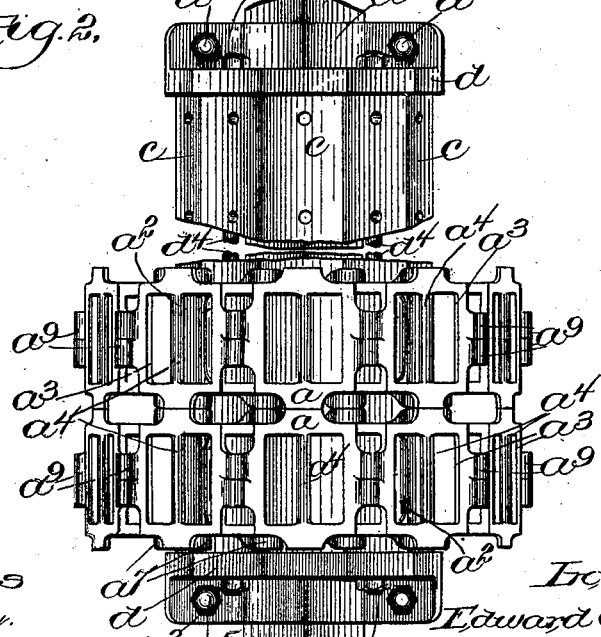

Figure 1 is a transverse section of a portion of a rotary brush embodying the invention. Fig. 2 is a plan view, partly broken away and showing a portion of the support with the cages removed. Fig. 3 is a partial longitudinal section, the supported shaft being shown in elevation; and Fig. 4 is a perspective view, on a larger scale, of one of the holders.

The holders $a$ for the broom material $b$ are herein shown as consisting of substantially-rectangular skeleton frames or boxes, each of which is provided with a retaining member $a^2$ far enough above the base to afford a sufficient space below the said retaining member to contain the bent portion of the broom material $b$. The said broom material may be assembled, as indicated, by pushing the loose ends through the bottom of the holder, one set of ends being at one side and the other set at the other side of the member $a^2$, and the natural elasticity of the broom material causes the same to spread, so as to be engaged and held by the confining members $a^3$ at the top of each holder, said confining members limiting the spread of the broom material and confining it in a position approximately radial to the broom-head, as shown in Fig. 1. As herein shown, each holder is provided with an additional cross member $a^4$, extending across the top parallel to the confining members $a^3$, the purpose of which is mainly to strengthen the holder, the said member, however, also aiding in the support of the broom material when the broom is in use and the forward ends of each bunch of broom material are being forced backward by the resistance of the ground. It is obvious that the skeleton construction of the holders herein shown is not essential, being adopted merely to lighten the structure and avoid the use of unnecessary material. Each of the said holders is adapted to be secured to a suitable base or support of such a nature as to close the bottom of the holder and prevent the broom material from being forced back endwise, and for this purpose each holder is shown as provided with bolt projections $a^5$, provided with nuts $a^6$.

While it is obvious that one or any number of the holders above described may be secured upon a base of any suitable shape or configuration to thereby form a broom or brush of any desired shape, the said holders are herein shown as arranged to form a rotary brush with a substantially-cylindrical sweeping-surface, and the base portions or supports form part of a general supporting-frame or broom-head arranged to be clamped or otherwise secured to a rotary shaft A. In this construction the base portions $c$ constitute the longitudinal members of a frame having end members or plates $d$, the said plates preferably being of metal having supporting-flanges $d^2$ and recesses $d^3$, each recess being adapted to contain the ends of a number of the longitudinal members $c$, polygonally arranged, as shown in Figs. 1 and 2, the recesses themselves being best indicated in Fig. 3. The two plates after the members $c$ are assembled, as described, are connected together by means of bolts $d^4$, extending from one to the other, thus securely clamping the whole frame together. For convenience in assembling the entire brush and securing the frame to the shaft A each of the plates $d$ may be made in two parts, as shown, arranged to fit upon the shaft A, which is rectangular, the supporting-flanges $d^2$ conforming to the said shaft and being extended, so as to come together beyond the said shaft to receive clamping-bolts $d^5$, whereby the entire frame is securely clamped to the shaft.

It is obvious that the supporting-frame may be of any length desired and adapted to carry any number of holders arranged endwise along the same, there being a set of holders for each support, so as to form a line of broom material extending along the same from one end to the other. To strengthen the complete structure, however, it is desirable to connect the holders on one support with the adjacent holders on the next support, so that each line of holders extending around the frame constitutes a strengthening-band tending to bind all the parts together and, furthermore, assisting to resist the strain which in use would tend to pull the holder containing the broom material which is in contact with the ground to the rear with relation to the direction of rotation of the brush.

As herein shown, the lower end members of each holder are extended beyond the lower side members of the same, and at one end of the holder the said end members are formed in the shape of hooks $a^7$, adapted to engage the projections $a^8$ at the opposite side of the adjacent holder. Each line of holders extending around the frame constitutes, therefore, a binding-chain tending to prevent lateral displacement of the frame members and greatly aiding in withstanding the strain. As herein shown, the holders are also connected together at the top, the upper side members of each holder being provided with a projecting lug $a^9$, the said lugs being offset with relation to each other, so as to overlap, and bored to receive the connecting-pin $a^{10}$, which passes through both of the lugs. The said side members are also arranged to abut, as shown, thus tending to resist pressure toward the shaft. It will be seen, therefore, that each set of holders is practically self-supporting, so far as resistance to the strains encountered in use is concerned, and may be secured upon a frame or shaft of any substantially polygonal or cylindrical shape. There is practically no tendency therefore for the projections $a^5$, which serve merely to keep the cages in place, to enlarge the openings and loosen the joints, as would be the case if the said projections afforded the sole means for resisting the strain upon the broom material.

When the main frame is made up as herein described, it may be desirable if the longitudinal members $c$ are of considerable length to strengthen the structure by intermediate bands D, arranged to conform to the periphery of the frame and to be clamped around in any suitable way.

While the invention has been shown as embodied in a rotary brush, the construction being mainly intended for this purpose, it is obvious that so far as relates to the holders for the broom material it is not essential that the brush should be of any particular shape, as will be readily understood. Furthermore, it is not intended to limit the invention to the specified construction of the frame herein described, since modifications may be made without departing from the invention.

I claim—

1. The herein-described holder for broom material which comprises the frame $a$ provided with the retaining member $a^2$ for the bent portion of the material; the members $a^3$ to laterally confine said material; and fastening devices whereby a line of holders secured to a single base may be connected together, as set forth.

2. A broom or brush comprising a series of holders to contain broom material, each holder having a cross member above the bottom to engage the bent portion of the broom material; and a supporting-frame for said holders comprising end members and one or more longitudinal members, the said longitudinal members being adapted to support the holders, as set forth.

3. A rotary brush comprising a frame having end members provided with surface channels; longitudinal members, the ends of which are adapted to be inserted in said channels; clamping-bolts extending from one end member to the other; and holders adapted to contain broom material, the said holders being fastened to said longitudinal members, as set forth.

4. A rotary brush comprising a frame having end members provided with surface channels; longitudinal members, the ends of which are adapted to be inserted in said channels; clamping-bolts extending from one end member to the other; one or more clamping-bands embracing said longitudinal members between said end members; and means for securing broom material to said frame, as set forth.

5. A rotary brush comprising a support; a series of holders for broom material extending around said support, each holder having means for retaining a bunch of broom material; means for securing each of the said holders to the said support; and means independent of the broom-material-holding means for connecting adjacent holders with each other, as set forth.

6. A rotary brush comprising a support; a series of individual holders for the broom material surrounding said support, each holder having as a part thereof a retaining member above the bottom to overlie the bent portion of the broom material; and means for connecting together adjacent holders whereby the series of holders constitutes a substantially-continuous band extending around the said support, as set forth.

7. A broom-head comprising end members and longitudinal members the said end members being adapted to be connected together to position and support the longitudinal members; and one or more lines or series of holders for broom material, each line or series surrounding the said support with adjacent holders connected together, substantially as described.

8. A broom-head comprising a rotatable support and a set of holders for broom material surrounding said support, each holder having a retaining member above the bottom to engage the bent portion of the broom material; confining members at the top to engage the sides of said broom material; interlocking devices whereby adjacent holders are connected together; and means for fastening each holder separately to said support, as set forth.

In testimony whereof I have signed my name to this specification in the presence of two subscribing witnesses.

EDWARD C. COLLINS.

Witnesses:
GEORGE H. SWIFT,
EDWARD T. HALL.